(12) United States Patent
Fu et al.

(10) Patent No.: US 10,645,302 B2
(45) Date of Patent: May 5, 2020

(54) IMAGE SENSING DEVICE HAVING ADJUSTABLE EXPOSURE PERIODS AND SENSING METHOD USING THE SAME

(71) Applicant: Egis Technology Inc., Taipei (TW)

(72) Inventors: Tong-Long Fu, Taipei (TW); Yu-Hsiang Huang, Taipei (TW); Chun-Ching Tseng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 15/884,390

(22) Filed: Jan. 31, 2018

(65) Prior Publication Data

US 2018/0288301 A1 Oct. 4, 2018

Related U.S. Application Data

(60) Provisional application No. 62/479,269, filed on Mar. 30, 2017.

(30) Foreign Application Priority Data

Dec. 8, 2017 (CN) .......................... 2017 1 1294810

(51) Int. Cl.
*H04N 5/235* (2006.01)
*G06K 9/00* (2006.01)
*G06K 9/20* (2006.01)

(52) U.S. Cl.
CPC ....... *H04N 5/2353* (2013.01); *G06K 9/00013* (2013.01); *G06K 9/2027* (2013.01); *H04N 5/2351* (2013.01)

(58) Field of Classification Search
None
See application file for complete search history.

(56) References Cited

U.S. PATENT DOCUMENTS

| | | | | |
|---|---|---|---|---|
| 6,292,576 | B1 * | 9/2001 | Brownlee | .......... G06K 9/00006 340/5.83 |
| 7,277,163 | B2 * | 10/2007 | Kono | ....................... G06K 9/00 356/71 |
| 7,382,931 | B2 * | 6/2008 | Kang | ....................... G06T 5/50 348/E5.034 |
| 8,385,611 | B2 * | 2/2013 | Shinzaki | ............ G06K 9/00114 283/68 |
| 8,798,395 | B2 | 8/2014 | Jo | |

(Continued)

FOREIGN PATENT DOCUMENTS

CN 105763816 A 7/2016

*Primary Examiner* — Cynthia Segura
(74) *Attorney, Agent, or Firm* — JCIPRNET

(57) ABSTRACT

An image sensing device includes a sensing module, including a plurality of sensing units, for generating a plurality of first sensing signals and a plurality of second sensing signals; and a plurality of control units, respectively corresponding to the plurality of sensing units, for exposing the plurality of sensing units based on a first exposure period to generate the plurality of first sensing signals, and determining a plurality of second exposure periods for the corresponding sensing units according to the plurality of first sensing signals, and exposing the plurality of sensing units based on the plurality of second exposure periods to generate the plurality of second sensing signals; wherein the plurality of first sensing signals and the plurality of second sensing signals are generated at different times.

13 Claims, 6 Drawing Sheets

(56) References Cited

U.S. PATENT DOCUMENTS

| | | | |
|---|---|---|---|
| 9,433,382 B2* | 9/2016 | Gu | A61B 5/6898 |
| 9,711,553 B2* | 7/2017 | Kim | H01L 27/14609 |
| 10,318,791 B2* | 6/2019 | He | G02B 6/0026 |
| 10,388,689 B2* | 8/2019 | Huang | H01L 27/14623 |
| 2005/0105785 A1* | 5/2005 | Shigeta | G06K 9/0004 |
| | | | 382/124 |
| 2008/0297597 A1* | 12/2008 | Inomata | G03B 7/00 |
| | | | 348/80 |
| 2013/0070121 A1* | 3/2013 | Gu | H04N 5/2329 |
| | | | 348/239 |
| 2013/0127714 A1* | 5/2013 | Gu | A61B 5/6898 |
| | | | 345/158 |
| 2014/0022354 A1* | 1/2014 | Okigawa | H04N 5/347 |
| | | | 348/46 |
| 2015/0244916 A1* | 8/2015 | Kang | H04N 5/2353 |
| | | | 348/222.1 |
| 2017/0300738 A1* | 10/2017 | Li | G06K 9/0004 |
| 2017/0316195 A1* | 11/2017 | Rieul | G06F 21/629 |
| 2018/0046837 A1* | 2/2018 | Gozzini | G06K 9/0004 |
| 2018/0080877 A1* | 3/2018 | Hirawake | G01N 21/6456 |
| 2018/0189540 A1* | 7/2018 | Chang | G06K 9/6212 |
| 2018/0233531 A1* | 8/2018 | Huang | G06K 9/0004 |
| 2019/0012517 A1* | 1/2019 | Li | G06K 9/40 |
| 2019/0122025 A1* | 4/2019 | Gove | G06K 9/00107 |

* cited by examiner

IMAGE SENSING DEVICE HAVING ADJUSTABLE EXPOSURE PERIODS AND SENSING METHOD USING THE SAME

CROSS REFERENCE TO RELATED APPLICATIONS

This application claims the benefit of U.S. Provisional Application No. 62/479,269, filed on Mar. 30, 2017, which is incorporated herein by reference.

BACKGROUND OF THE INVENTION

1. Field of the Invention

The present invention relates to an image sensing device and sensing method, and more particularly, to an image sensing device and sensing method capable of adjusting a length of exposure period of each of sensing units to improve resolution of an image.

2. Description of the Prior Art

With the advance and development of technology, image sensing devices are utilized in many kinds of electronic devices, for example, digital camera, optical fingerprint recognition system and so on, wherein the optical fingerprint recognition system has been widely utilized. In the conventional technology, the lengths of exposure periods of all sensing units are the same. However, since the distribution of light field intensity is uneven and the intensities of light fields in which the sensing units of the image sensing device of the optical fingerprint recognition system are located are different, the intensities of the sensed light are different, which causes the problem of uneven brightness of the sensed image, affects the image quality, further increases complexity of image processing and decreases accuracy rate of fingerprint recognition. Accordingly, how to provide an image sensing device for optical fingerprint recognition to avoid the problems stated above has been one of the major objectives in the related industry.

SUMMARY OF THE INVENTION

It is therefore an object of the present invention to provide an image sensing device and sensing method for optical fingerprint recognition which is capable of adjusting lengths of exposure periods of sensing units to improve quality of an image and further increase accuracy rate of fingerprint recognition.

The present invention provides an image sensing device, comprising a sensing module, comprising a plurality of sensing units, for generating a plurality of first sensing signals and a plurality of second sensing signals; and a plurality of control units, respectively corresponding to the plurality of sensing units, for exposing the plurality of sensing units based on a first exposure period to generate the plurality of first sensing signals, and determining a plurality of second exposure periods for the corresponding sensing units according to the plurality of first sensing signals, and exposing the plurality of sensing units based on the plurality of second exposure periods to generate the plurality of second sensing signals; wherein the plurality of first sensing signals and the plurality of second sensing signals are generated at different times.

The present invention further provides a sensing method for an image sensing device comprising a sensing module comprising a plurality of sensing units and a plurality of control units respectively corresponding to the sensing units, a control bus coupled to the sensing module and a signal processing circuit coupled to the control bus, the sensing method comprising using the control units for exposing the corresponding sensing units based on a first exposure period to generate a plurality of first sensing signal; using the control units for determining a plurality of second exposure periods corresponding to the sensing units according to the first sensing signals; using the control units for exposing the corresponding sensing units based on the second exposure periods to generate a plurality of second sensing signals; and using the control bus for transmitting the second sensing signals to the signal processing circuit to generate an image.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
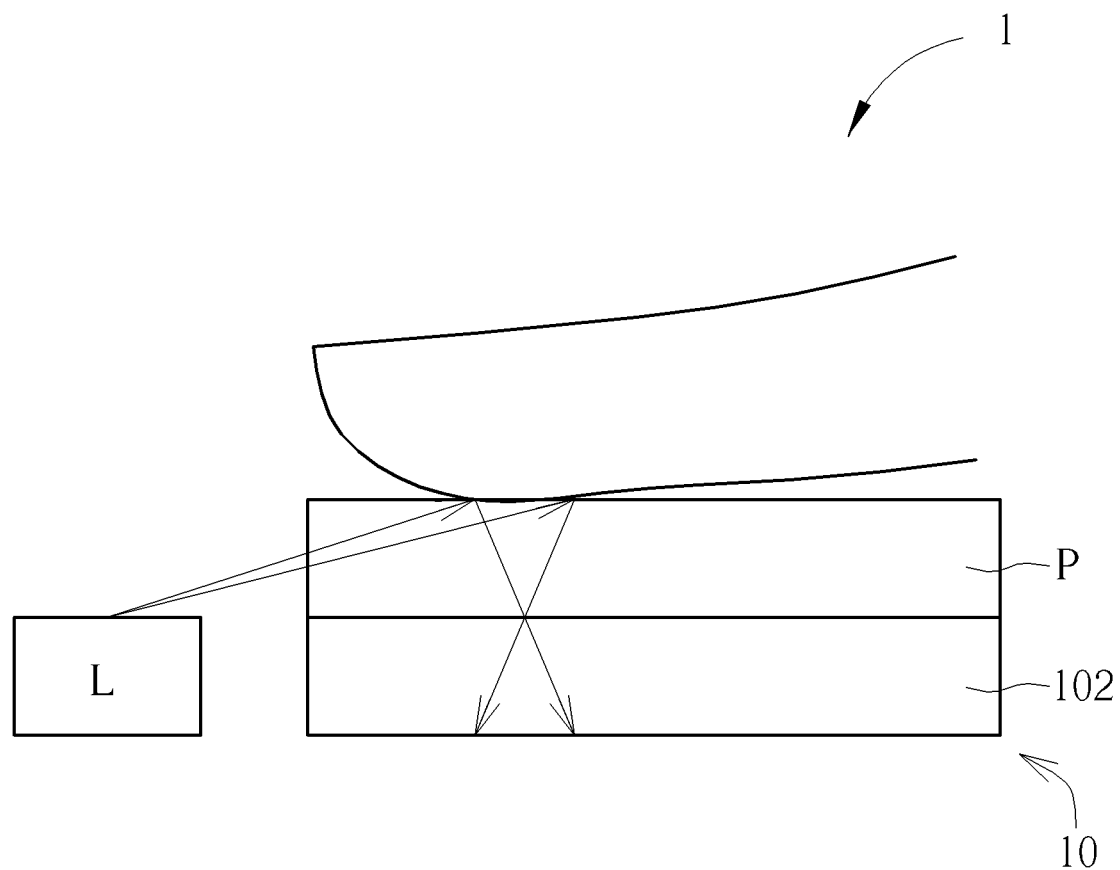
FIG. 1A is a schematic diagram of a fingerprint recognition system according to an embodiment of the present invention.
Figure 1B:
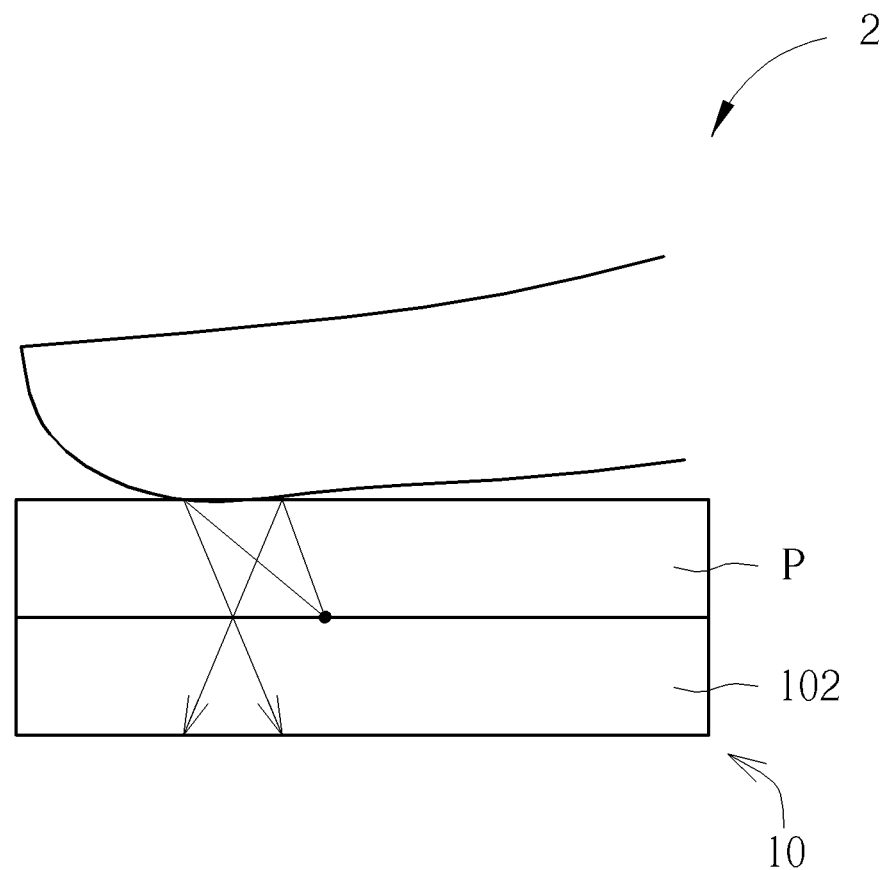
FIG. 1B is a schematic diagram of another fingerprint recognition system according to another embodiment of the present invention.

Please refer to FIG. 1A, which is a schematic diagram of a fingerprint recognition system 1 according to an embodiment of the present invention. The fingerprint recognition system 1 utilizes an image sensing device 10 for sensing fingerprint of a finger for fingerprint recognition. The image sensing device 10 includes a sensing module 102, a light source L and a panel P. For example, in an embodiment, when a finger of a user places on the fingerprint recognition system 1, a light-emitting diode (LED) light source emits light to the surface of the finger, and the light is reflected from the finger and transmitted to the sensing module 102. Next, the sensing module 102 receives and senses the reflected light to generate a plurality of sensing signals. Or, in another embodiment, please refer to FIG. 1B, which is a schematic diagram of another fingerprint recognition system 2 according to an embodiment of the present invention. Different from the fingerprint recognition system 1 of FIG. 1A, the panel P in FIG. 1B comprises an organic light-emitting diode (OLED) display, and the OLED display is utilized to be a light source for emitting light to the surface of a finger, and the light is reflected by the finger and then transmitted to the sensing module 102. Then, the sensing module 102 receives and senses the reflected light to generate a plurality of sensing signals.

Figure 2:
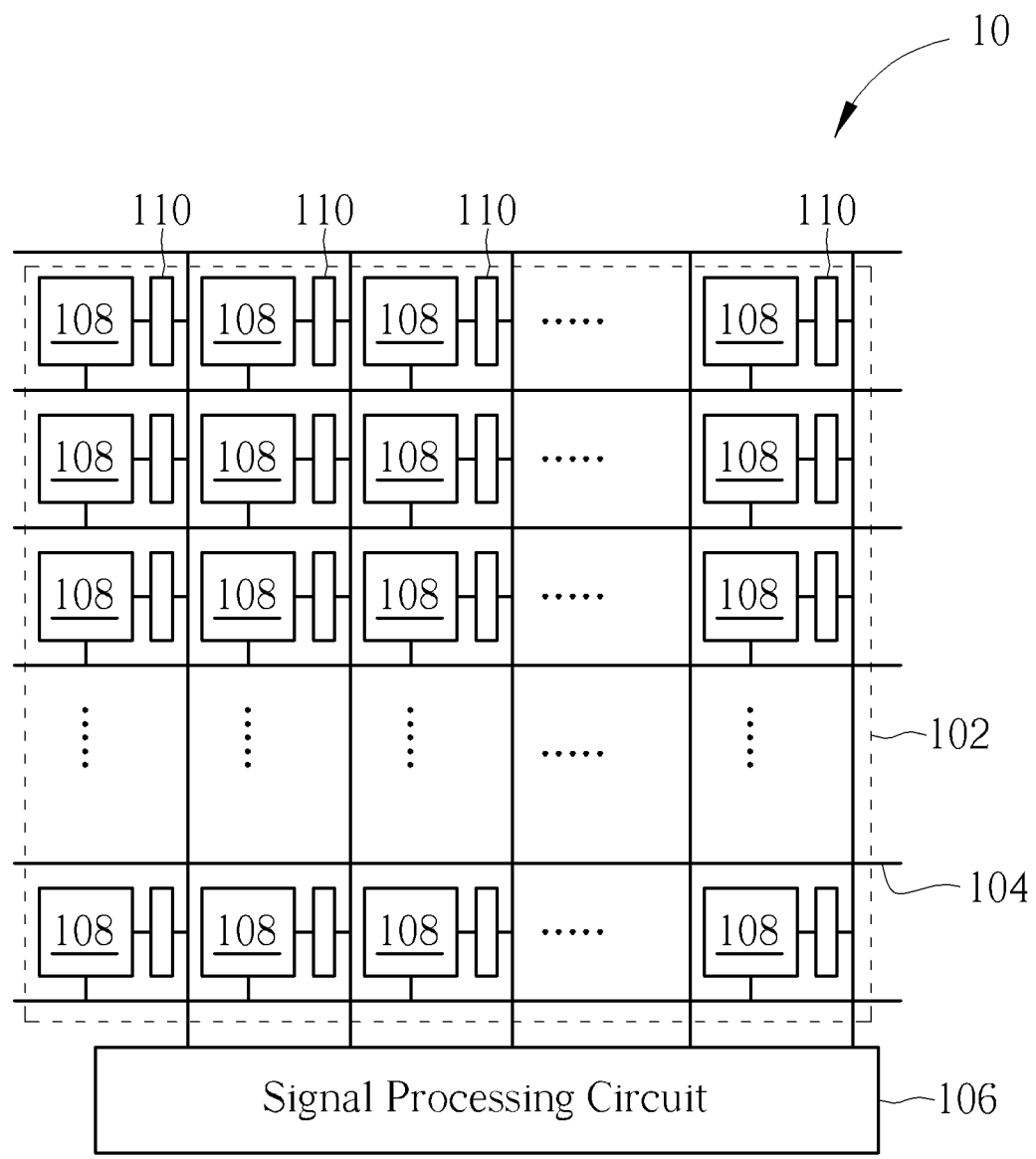
FIG. 2 is a schematic diagram of an image sensing device according to an embodiment of the present invention.

In detail, please continue to refer to FIG. 2, which is a schematic diagram of an image sensing device 10 according to an embodiment of the present invention. The image sensing device 10 is utilized for generating and processing the sensing signals to generate a sensing image. The image sensing device 10 further includes a control bus 104 and a signal processing circuit 106. The sensing module 102 may be implemented by a pixel matrix, e.g. a structure of pin hole pixel array. In this embodiment, the sensing module 102 comprises a plurality of sensing units 108 and a plurality of control units 110. For example, each of the sensing units 108 is a pixel of the pixel matrix, wherein each of the sensing units 108 is utilized for generating a first sensing signal and a second sensing signal, and each of the control units 110 respectively corresponds to one sensing unit 108. For performing fingerprint recognition, each of the control units 110 respectively turns on and exposes the corresponding sensing unit 108 to the reflected light for a predetermined first exposure period so as to generate a first sensing signal. Then, the control unit 110 determines a second exposure period for its corresponding sensing unit 108 according to the first sensing signal generated by the sensing unit 108, and exposes the sensing unit 108 to the reflected light for the second exposure period, so as to generate a second sensing signal. The control bus 104 is coupled to the sensing module 102, for receiving the second sensing signals generated by the sensing units 108 of the sensing module 102. The signal processing circuit 106 is coupled to the control bus 104 for receiving the second sensing signals from the control bus 104 to generate a fingerprint image accordingly. Therefore, the image sensing device 10 utilizes each of the control units 110 to respectively control the exposure period for its corresponding sensing unit 108, so as to improve quality of the sensed image and increase the image resolution.

The embodiments stated in the above are utilized for illustrating that the image sensing device of the present invention utilizes each of the control unit 110 for controlling the exposure period of the corresponding sensing unit 108, so as to turn on and expose the sensing units 108 to the reflected light for different lengths of exposure periods, rather than exposing all the sensing units 108 for the same length of exposure period, and improves the quality of the sensing signals and the resolution of the sensed image. Notably, the skilled person in the art may properly design the image sensing device according to various requirements of different systems; for example, one single control unit 110 may not only control one single corresponding sensing unit 108, but also simultaneously control several corresponding sensing units 108, or the control units 110 may be implemented by software setting or circuit controllers of hardware and so on, to improve the resolution of the sensed image.

Figure 3:
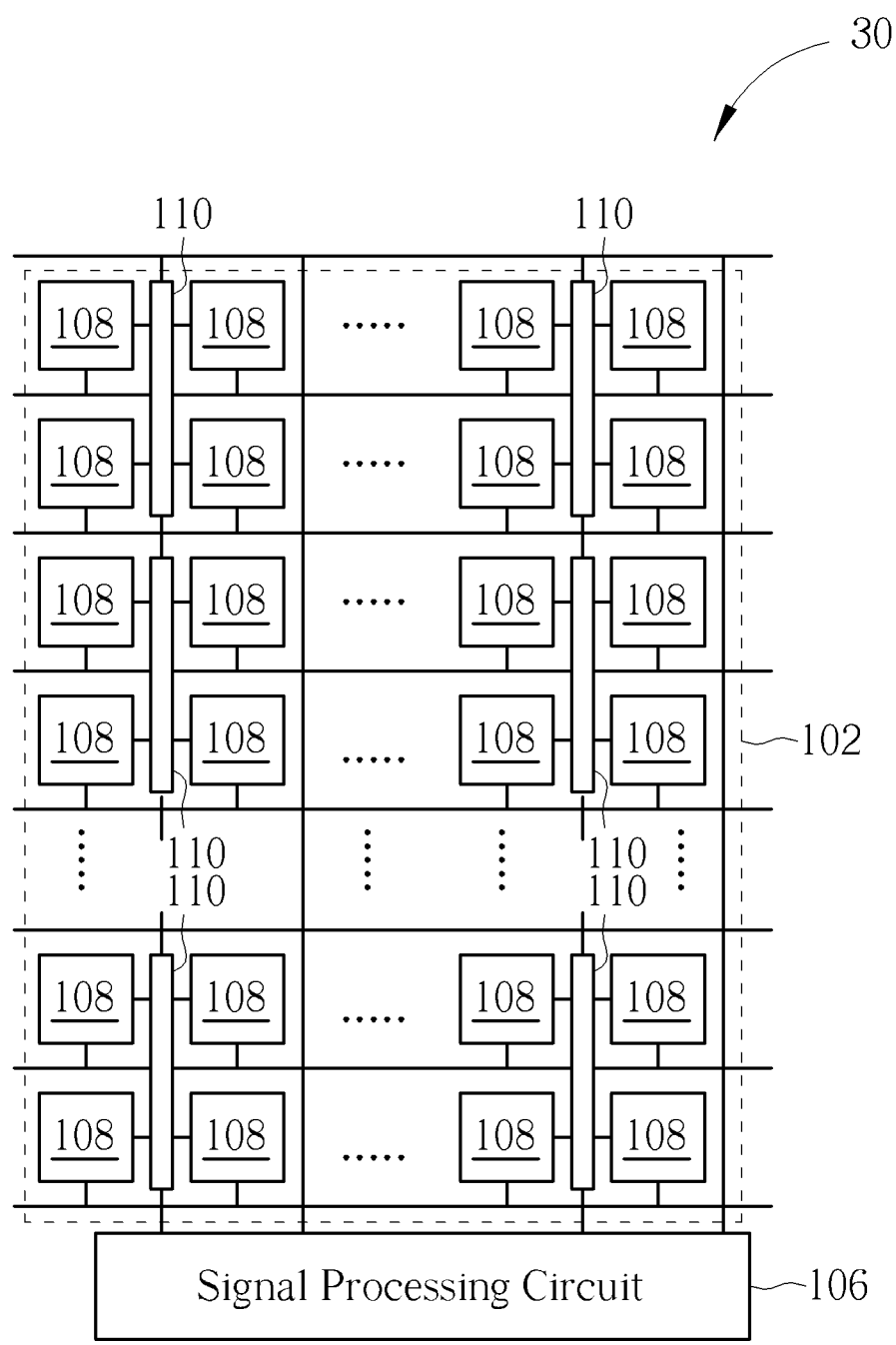
FIG. 3 is a schematic diagram of another image sensing device according to another embodiment of the present invention.

Please refer to FIG. 3, which is a schematic diagram of another image sensing device 30 according to an embodiment of the present invention. Different from FIG. 2, each of the control units 110 of the image sensing device 30 in FIG. 3 corresponds to four sensing units 108. In other words, each of the control units 110 may simultaneously or respectively control the four sensing units 108 to be exposed to the reflected light for the same second exposure period or different second exposure periods. In detail, the first sensing signal and the second sensing signal of each sensing unit 108 are generated at different times. The control unit 110 determines the second exposure period of the corresponding sensing unit 108 according to a light sensing value (i.e. brightness) of the first sensing signal. In this embodiment, the control unit 110 may be a switch to turn on or off the corresponding sensing unit 108, so as to adjust the length of the exposure period of the corresponding sensing unit 108, but is not limited thereto. That is, in one embodiment, each of the control units 110 is coupled to one corresponding sensing unit 108 (as shown in FIG. 2), and each of the control units 110 respectively determines and adjusts the second exposure period of its corresponding sensing unit 108 according to the first sensing signal generated by such sensing unit 108. In another embodiment, each of the control units 110 is coupled to several sensing units 108 (as shown in FIG. 3), and each of the control units 110 simultaneously or respectively determines and adjusts one or more second exposure periods of the corresponding sensing units 108 according to the first sensing signals generated by such sensing units 108. Since the light sensing values (i.e. values of brightness) of the first sensing signals generated by the sensing units 108 are different, the second exposure periods for such sensing units 108 will be determined to be different accordingly. Therefore, by determining and adjusting the second exposure periods of the sensing units 108 through their corresponding control units 110, the image sensing device 30 may control and adjust the second exposure periods of the sensing units 108 so as to expose the sensing units 108 to the reflected light for different periods of time according to the different intensities of light fields where the sensing units 108 are located. In consequence, the resolution of the sensed image will be improved.

In detail, the control unit 110 determines the second exposure period for its corresponding sensing unit 108 according to the light sensing value (i.e. brightness) of the first sensing signal generated by such sensing unit 108. For example, when the intensity of the light field in which the sensing unit 108 is located is high, the sensing unit 108 will sense more light in the first exposure period than other sensing units 108 which are located in the light fields with lower intensities (i.e. the light sensing value of the first sensing signal generated by the sensing unit 108 is higher than those generated by such other sensing units 108). After the control unit 110 determines the corresponding second exposure period, the control unit 110 properly turns on and off the corresponding sensing unit 108, so as to decrease the second exposure period corresponding to the sensing unit 108. In contrast, when the intensity of the light field in which the sensing unit 108 is located is low, the sensing unit 108 will sense less light in the first exposure period (i.e. the light sensing value of the first sensing signal generated by the sensing unit 108 is low). After the control unit 110 determines the corresponding second exposure period, the control unit 110 properly turns on and off the corresponding sensing unit 108, so as to increase the second exposure period corresponding to the sensing unit 108.

Figure 4:
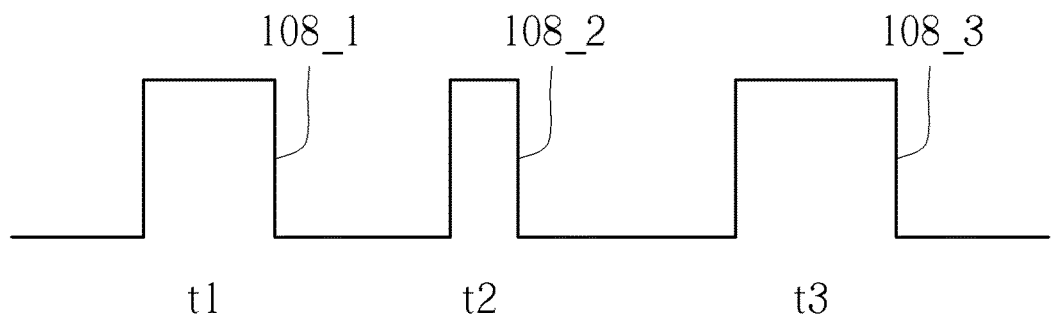
FIG. 4 is a schematic diagram showing different sensing units with different exposure periods according to an embodiment of the present invention.
Figure 5:
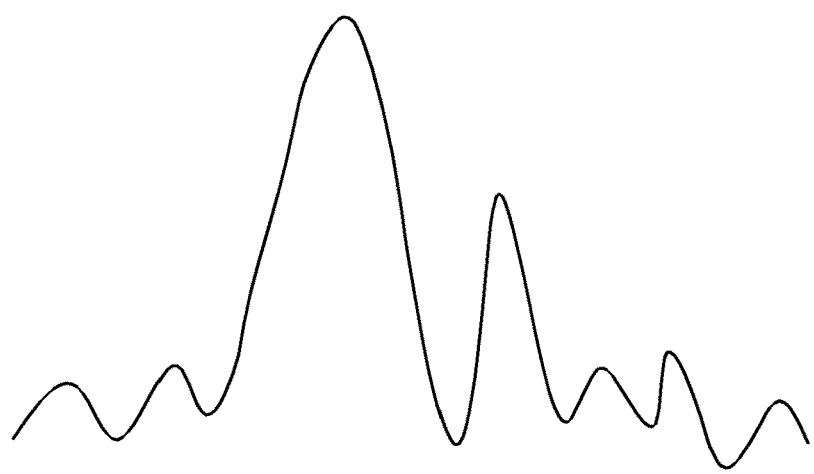
FIG. 5 is a schematic diagram showing a Gaussian distribution of intensity of light field.
Figure 6:
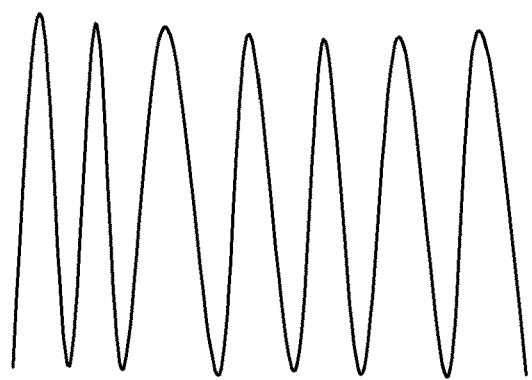
FIG. 6 is a schematic diagram showing a uniform distribution of intensity of light field.

Please refer to FIG. 4, which is a schematic diagram of different sensing units 108 with different exposure periods according to an embodiment of the present invention. In FIG. 4, the sensing units 108_1, 108_2, 108_3 respectively correspond to exposure periods t1, t2, t3. That is, the exposure period t1 of the sensing unit 108_1, the exposure period t2 of the sensing unit 108_2 and the exposure period t3 of the sensing unit 108_3 are not the same. Note that, the control unit 110 may control a pixel clock to manage the exposure period of the sensing unit 108, i.e. to change or adjust the exposure period, or use any other control methods to control or adjust the exposure period of the sensing unit 108, but the invention is not limited thereto. Therefore, when the light intensities sensed by the sensing units 108 of the sensing module 102 form a Gaussian distribution as shown in FIG. 5 or a non-uniform distribution, the present invention may utilize the control units 110 to determine the second exposure periods corresponding to the sensing units 108 according to the first sensing signals, and turn on and off the corresponding sensing units 108 according to the second exposure periods, so as to control the second exposure periods of the corresponding sensing units 108, such that the light sensing values of the second sensing signals generated by the sensing units 108 may form a uniform distribution of light field as shown in FIG. 6.

Figure 7:
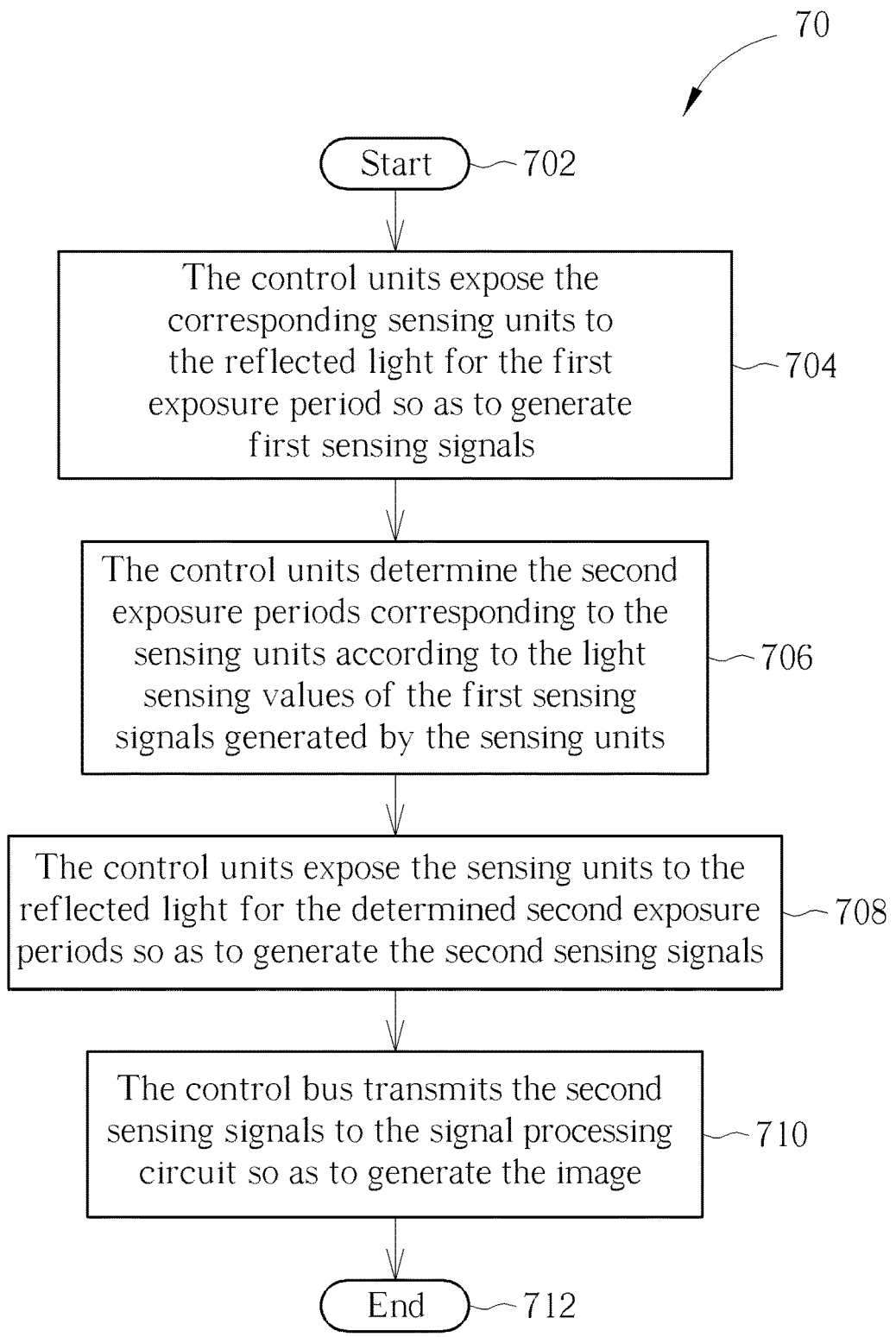
FIG. 7 is a schematic diagram of a sensing flowchart according to an embodiment of the present invention.

More specifically, the exposure control method applied to the image sensing device 30 stated above may be summarized as a sensing flowchart 70. Please refer to FIG. 7, which is a schematic diagram of the sensing flowchart 70 according to an embodiment of the present invention. The sensing flowchart 70 includes the following steps:

Step 702: Start.

Step 704: The control units 110 expose the corresponding sensing units 108 to the reflected light for the first exposure period so as to generate a first sensing signal. All of the sensing units 108 share the same first exposure period.

Step 706: The control units 110 determine the second exposure periods corresponding to the sensing units 108 according to the light sensing values of the first sensing signals generated by the sensing units 108.

Step 708: The control units 110 expose the sensing units 108 to the reflected light for the determined second exposure periods so as to generate the second sensing signals.

Step 710: The control bus 104 transmits the second sensing signals to the signal processing circuit 106 so as to generate the image.

Step 712: End.

According to the sensing flowchart 70, the image sensing device 30 of the present invention utilizes the control units 110 to properly turn on or off the corresponding sensing units 108, so as to adjust the second exposure periods. In an embodiment, for each of the sensing units 108, according to Step 704, the control unit 110 exposes the corresponding sensing unit 108 to the reflected light based on the predetermined first exposure period so as to generate the first sensing signal. All of the sensing units 108 share the same first exposure period. Next, in Step 706, the control unit 110 determines the second exposure period of the corresponding sensing unit 108 according to the light sensing value of the first sensing signal. For example, when the distribution of light field represented by the first sensing signals (i.e. the distribution represented by the light sensing values) is the Gaussian distribution as shown in FIG. 5 or the non-uniform distribution, the control units 110 determine the second exposure periods of the sensing units 108 according to the light sensing values of the first sensing signals, which reflect the intensities of light fields in which the sensing units 108 are located, and turn on and off the corresponding sensing units 108 to accordingly adjust the second exposure periods corresponding to the sensing units 108. In Step 708, the control units 110 expose the sensing units 108 based on the determined second exposure periods so as to generate the second sensing signals. Finally, in Step 710, the control bus 104 transmits the generated second sensing signals to the signal processing circuit 106 so as to generate the image. Notably, the description mentioned above is for the embodiment where a control unit 110 is corresponding to a single sensing unit 108. In another embodiment, one control unit 110 is connected to and controls several sensing units 108, and the control unit 110 may properly turn on and off one or more sensing units 108 based on the second exposure period of each sensing unit 108 to adjust the length of exposure period of each of the one or more sensing units 108, and the details of such embodiment are not narrated herein for brevity.

In the embodiments mentioned above, each of the sensing units 108 is exposed to the reflected light twice so as to generate the first sensing signal and the second sensing signal. More specifically, the first sensing signal, which is generated when the sensing unit 108 is first turned on to sense the reflected light, is utilized for determining the intensity of the light field where the sensing unit 108 is located so as to adjust and set the second exposure period accordingly. When the sensing unit 108 is turned on at the second time, the sensing unit 108 is exposed to the reflected light for the second exposure period so as to generate the second sensing signal. The second sensing signal is then transmitted to the signal processing circuit 106 for generating a fingerprint image. Since the intensity distribution of light field is varied with time, each time before performing fingerprint recognition, the image sensing device needs to detect the intensity distribution of light field and the control units 110 have to determine the second exposure periods of the sensing units 108. That is, when performing fingerprint recognition, the image sensing device 30 turns on all of the sensing units 108 for the predetermined first exposure period in order to sense the intensity distribution of light field, e.g. to turn on all of the sensing units 108 for the predetermined first exposure period of 10 ms. Next, each of the control units 110 determines the intensity of light field in which the corresponding sensing unit 108 is located according to the light sensing value of the first sensing signal generated by the corresponding sensing unit 108, and determines the second exposure period of such sensing unit 108 accordingly. Note that, since a distance and a relative position between each of the sensing units 108 and the light source L or the panel P are not the same, the sensed light intensity and the light sensing value of the first sensing signal generated by each of the sensing units 108 are different from each other. Then, each of the control units 110 determines the second exposure period of its corresponding sensing unit 108, and the control unit 110 exposes the corresponding sensing unit 108 to the reflected light for the determined second exposure period to generate the second sensing signal. Finally, the control bus 104 transmits the second sensing signals generated by the sensing units 108 to the signal processing circuit 106 to generate the fingerprint image.

In addition, each of the control units 110 of the image sensing device may be coupled or corresponding to several sensing units 108, so as to simultaneously or individually control the exposure period (s) of one or more sensing units 108. In this embodiment, the image sensing device of the present invention may determine the exposure period(s) of one or more sensing units 108 according to the intensity distribution of light field within a specific region where such sensing units 108 are located or the light sensing values corresponding to such sensing units 108, or adjust the exposure period(s) of one or more sensing units 108 according to system and hardware requirements so as to effectively improve the quality and resolution of the sensed image.

Note that, the embodiments stated above are utilized for illustrating the spirit of the present invention, within which those skilled people in the art may make various modifications and alternations, and the present invention is not limited thereto. For example, the control units of the image sensing device may not only be implemented by circuit controllers of hardware, but also implemented by setting programmable software. The control units of the image sensing device may not only control the exposure period(s) for one or more sensing units, but also control the exposure period for a combination or group of several sensing units or a specific region where several sensing units are located, so as to meet various requirements of users and manufacturers. The embodiments mentioned above may be properly modified, and all belong to the scope of the present invention.

In summary, the present invention provides an image sensing device and sensing method thereof for a fingerprint recognition system, more particularly, an optical fingerprint sensor of a fingerprint recognition system, which utilizes control units to control exposure periods of sensing units, so as to reduce impacts caused by non-uniform or uneven intensity distribution of light field, improve the quality of the sensed image, and increase the resolution of the fingerprint image, increasing the accuracy rate of fingerprint recognition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing device of a fingerprint recognition system, comprising:
   a sensing module, comprising:
      a plurality of sensing pixels, for generating a plurality of first sensing signals corresponding to a fingerprint of a finger and a plurality of second sensing signals corresponding to the fingerprint of the finger, wherein the first sensing signals are generated by the sensing pixels sensing a light emitted by a light source or a display panel disposed beside the sensing pixels and then reflected by the fingerprint of the finger to the sensing pixels; and
      a plurality of circuit controllers, respectively corresponding to the plurality of sensing pixels, for exposing the plurality of sensing pixels based on a first exposure period to generate the plurality of first sensing signals, and determining a plurality of second exposure periods for the corresponding sensing pixels according to the plurality of first sensing signals, and exposing the plurality of sensing pixels based on the plurality of second exposure periods to generate the plurality of second sensing signals;
   wherein the plurality of first sensing signals and the plurality of second sensing signals are generated at different times;
   wherein a fingerprint image corresponding to the fingerprint of the finger is generated according to only the plurality of second sensing signals;
   wherein the circuit controllers determine a first intensity distribution of light field in which the plurality of sensing pixels are located according to the plurality of first sensing signals, and determine the plurality of second exposure periods corresponding to the sensing pixels according to light sensing values of the first sensing signals generated by the corresponding sensing pixels;
   wherein the light sensing values of the plurality of first sensing signals are different so that the second exposure periods corresponding to the sensing pixels are determined to be different accordingly, and the second exposure periods corresponding to the sensing pixels are inversely proportional to the light sensing values of the first sensing signals generated by the corresponding sensing pixels.

2. The image sensing device of claim 1, wherein the circuit controllers control and adjust the plurality of second exposure periods corresponding to the sensing pixels by turning on or off the sensing pixels.

3. The image sensing device of claim 1, wherein the first intensity distribution of light field is a Gaussian distribution or a non-uniform distribution.

4. The image sensing device of claim 1, wherein the plurality of second exposure periods corresponding to different sensing pixels are not the same.

5. The image sensing device of claim 1, further comprising:
   a control bus, coupled to the sensing module, for receiving the plurality of second sensing signals generated by the sensing module; and
   a signal processing circuit, coupled to the control bus, for generating the fingerprint image according to the plurality of second sensing signals.

6. The image sensing device of claim 1, wherein the sensing module is a pin hole array.

7. The image sensing device of claim 1, wherein the first exposure period is predetermined.

8. The sensing method of claim 1, wherein each of the circuit controllers is coupled to and configured to control several sensing pixels.

9. A sensing method, for an image sensing device of a fingerprint recognition system comprising a sensing module comprising a plurality of sensing pixels and a plurality of circuit controllers respectively corresponding to the sensing pixels, a control bus coupled to the sensing module and a signal processing circuit coupled to the control bus, the sensing method comprising:
   using the circuit controllers for exposing the corresponding sensing pixels based on a first exposure period to generate a plurality of first sensing signal corresponding to a fingerprint of a finger, wherein the first sensing signals are generated by the sensing pixels sensing a light emitted by a light source or a display panel disposed beside the sensing pixels and then reflected by the fingerprint of the finger to the sensing pixels;
   using the circuit controllers for determining a plurality of second exposure periods corresponding to the sensing pixels according to the first sensing signals;
   using the circuit controllers for exposing the corresponding sensing pixels based on the second exposure periods to generate a plurality of second sensing signals corresponding to the fingerprint of the finger; and
   using the control bus for transmitting the second sensing signals to the signal processing circuit to generate a fingerprint image;
   wherein the fingerprint image corresponding to the fingerprint of the finger is generated according to only the plurality of second sensing signals;
   wherein the circuit controllers determine a first intensity distribution of light field in which the plurality of sensing pixels are located according to the plurality of first sensing signals, and determine the plurality of second exposure periods corresponding to the sensing pixels according to light sensing values of the first sensing signals generated by the corresponding sensing pixels;
   wherein the light sensing values of the plurality of first sensing signals are different so that the second exposure periods corresponding to the sensing pixels are determined to be different accordingly, and the second exposure periods corresponding to the sensing pixels are inversely proportional to the light sensing values of the first sensing signals generated by the corresponding sensing pixels.

10. The sensing method of claim 9, further comprising: using the circuit controllers for adjusting the second exposure periods corresponding to the sensing pixels by turning on or off the sensing pixels.

11. The sensing method of claim 9, wherein the first intensity distribution of light field is a Gaussian distribution or a non-uniform distribution.

12. The sensing method of claim 9, wherein the first exposure period is predetermined.

13. The sensing method of claim 9, wherein each of the circuit controllers is coupled to and configured to control several sensing pixels.

* * * * *